United States Patent Office 2,787,530
Patented Apr. 2, 1957

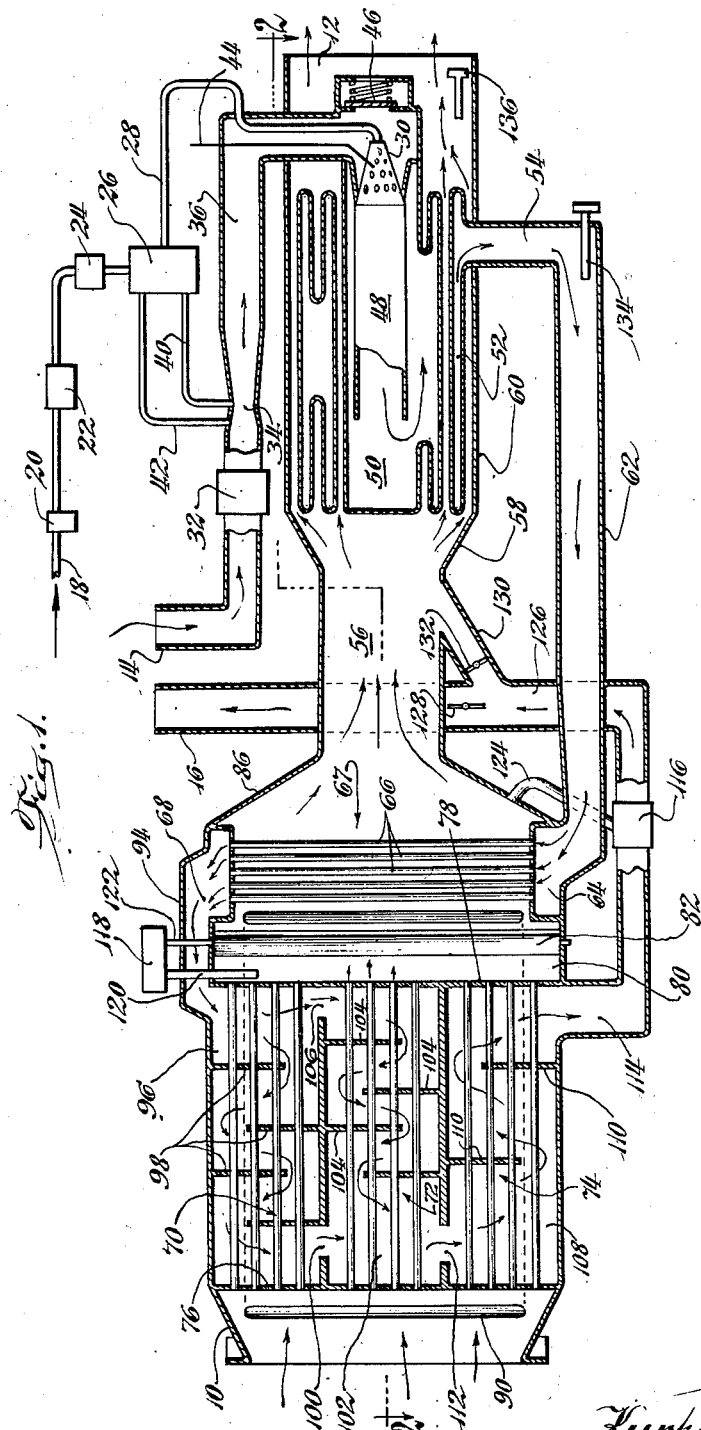

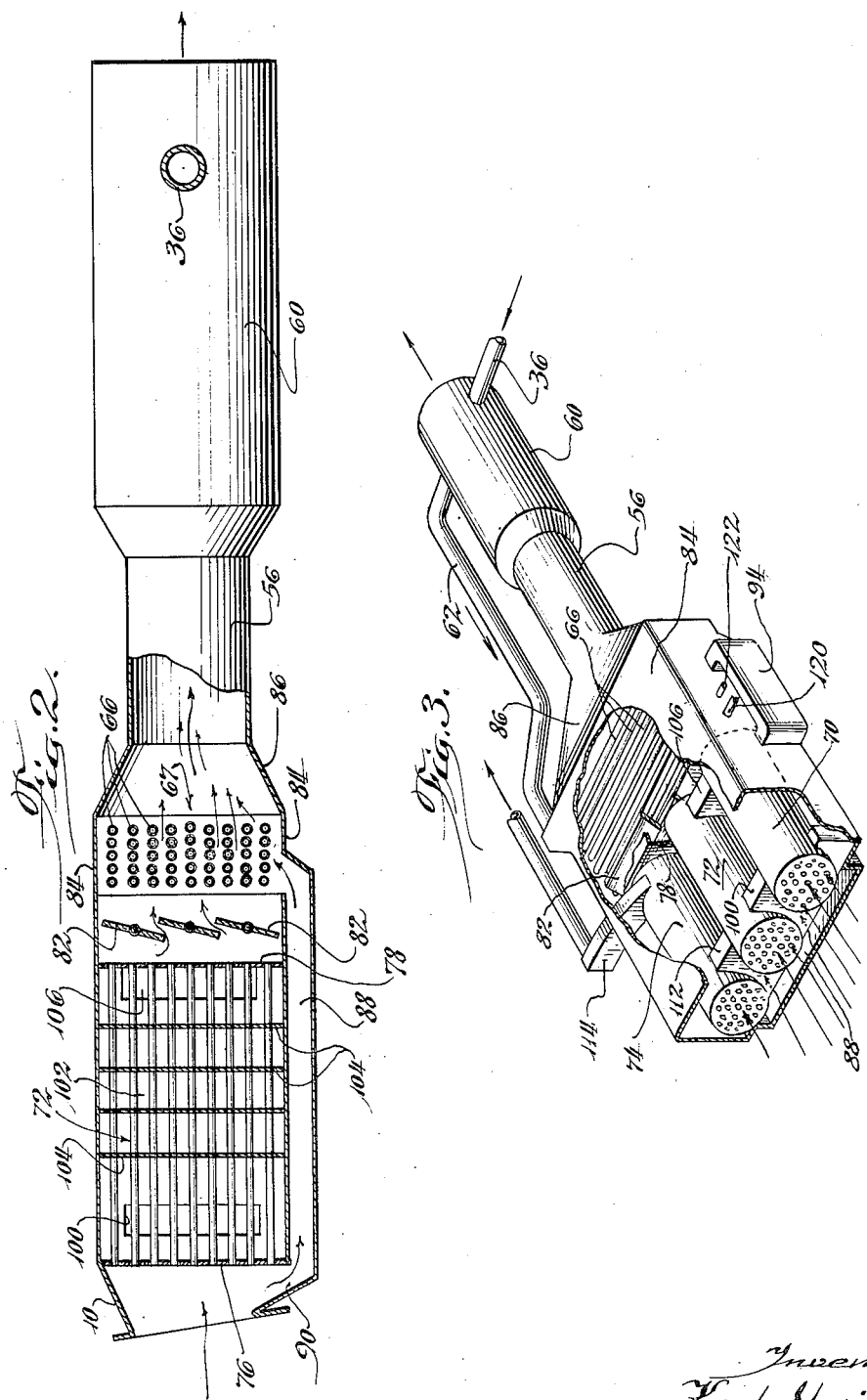

2,787,530

PURGE GAS SYSTEM FOR AIRCRAFT

Kurt Staiger, Indianapolis, Ind., assignor to Stewart-Warner Corporation, Chicago, Ill., a corporation of Virginia Application April 19, 1955, Serial No. 502,450

5 Claims. (Cl. 23—281)

The present invention relates generally to the art of fire and explosion prevention in aircraft, especially military aircraft.

Within any aircraft there is much closed space, or substantially closed space, which is not occupied by personnel and within which fuel vapors might under some conditions collect, the fuel bays for instance. These vapors when mixed with air in such spaces present an explosion or fire hazard. Furthermore, particularly in jet powered aircraft it is possible to encounter a combustible mixture in the spaces above the fuel in the fuel cells themselves.

One method of preventing a hazardous condition from arising in the fuel cells and bays and other enclosed areas where fuel might collect, is to purge these spaces by passing therethrough a continuous flow of an inert gas. This inert gas removes some of the fuel vapor and more importantly purges the oxygen containing air from the spaces so that a combustible mixture cannot be formed even in the presence of fuel vapor.

Systems for accomplishing this are now in use, one such system being described in the copending application of Donald A. Potter and Henry A. Geisler, for "Purging Gas Generator," Serial No. 324,974, filed December 9, 1952. The present system as a whole bears similarities to the system disclosed in that application, and the invention to which the present application is directed resides largely in the provision of a different arrangement for cooling the raw purge gases which are produced by the combustion of a rather precisely regulated fuel air mixture.

The principal object of the present invention is to provide a novel small, lightweight arrangement for exchanging heat from hot products of combustion to an air stream which is particularly well adapted for the cooling of purge gases intended for use in removing air and other vapors from unoccupied portions of an aircraft structure.

Still anther object is to provide a heat exchange arrangement which is peculiarly adapted to the problem of lowering the temperature of products of combustion to a safe range but in which there is provision for preventing the possibility of freezing of water condensed from such gases, the whole being provided in a structure of extremely low weight, compact proportions, and minimum complexity.

Other objects and advantages will become apparent from the following description of a preferred embodiment of my invention which is illustrated in the accompanying drawings.

In the drawings, in which similar characters of reference refer to similar parts throughout the several views, Figure 1 is a diagrammatic representation of a purge gas generating system which embodies features of the present invention. The view may be considered as essentially a medial horizontal sectional view through the apparatus;

Fig. 2 is a diagrammatic view of the apparatus of Fig. 1 taken partly from the side thereof and partly along the section line 2—2 of Fig. 1.

Fig. 3 may be considered as a diagrammatic perspective view from the ventilating air inlet end of the apparatus of Figs. 1 and 2 shown with a portion of the casing removed so as better to disclose the underlying structure.

As is fully explained in the previously referred to copending application, purging gases can be formed by mixing fuel, taken from the aircraft engine fuel supply system, with air in proper proportion, and then burning this mixture so as to produce products of combustion which are rich in nitrogen and carbon dioxide and very low in oxygen. These raw products of combustion are at a high temperature and contain a considerable proportion as water vapor. Some carbon is also present. These products of combustion must be cooled sufficiently so that their use will not damage any of the aircraft structure. This cooling is of course accompanied by condensation of water, much of which is readily removable—and takes most of the carbon with it—through the employment of a conventional cyclone type centrifugal separator. The cooled dewatered gases, however, will be saturated and may contain some water in the liquid state. On the way to the bays and fuel cells, and within the spaces additional cooling and condensation will ordinarily take place especially when the ambient temperature is low. The result is that if special precautions are not taken, there may be conditions under which the temperature of the purge gases will drop below the freezing point of water. One of the serious problems encountered in systems of this type, therefore, is preventing the possibility of freezing in the purge gas lines, valves and spaces to be purged.

From the above it will be apparent that the problem is, therefore, one of cooling hot products of combustion to a usable range of temperatures, while on the other hand insuring that these products of combustion will not be so greatly cooled as to bring about the possibility of ice formation. This problem is much greater than might be supposed, because in order to reduce the weight and complexity of the system to a minimum, it is advisable to make extensive use of equipment already available in the aircraft which was provided without consideration for the needs of purging systems, and this equipment can be expected to have an effect upon the purge gas system because of variation in the conditions under which it may inherently operate because of other aircraft requirements.

For those who are interested, this matter is fully discussed in the previously referred to copending application and needs no special explanation here, but a brief survey of the situation discloses that upon jet engine aircraft the most readily available source of compressed air as a raw ingredient for the formation of the purge gases is the compressor stage of one of the jet engines. Air from such a source will be at a sufficiently high pressure to insure adequate flow through the system including the spaces to be purged, but the rate of flow if not controlled will nevertheless vary rather widely because the pressure available from the jet engine compressor will vary depending upon the thrust output of the engine. As an example, a rapid climb will produce higher pressures in the compressor stage of the jet engine than will glide in which the power requirements are low. Also of course, the air density due to altitude variations will affect the situation.

The most readily available source of ventilating air or cooling the products of combustion is a ram or scoop in the aircraft slip stream. The rate of cooling air flow through the system therefor, and the temperature of the cooling air will depend—unless special control means are provided—upon the altitude of the aircraft, its rate of movement, and the temperature of the ambient air.

Since all of the variables discussed above are subject to wide and more or less independent fluctuation, the control problem is seen to be quite complex if practical operation is to be achieved.

The apparatus of the present invention is illustrated and will be described upon the assumption that certain facilities will be made available from the aircraft in which the system is installed. For instance, it is assumed that fuel will be supplied at an appropriate pressure either from a specially provided fuel pump or from one of the engine fuel pumps. As mentioned previously, compressed combustion air will be obtained from a tap into the compressor section of one of the aircraft jet engines. These taps, incidentally, are ordinarily included on aircraft jet engines and are used for a variety of purposes. Any other suitable source of compressed air can of course be provided as an alternative. It is also assumed that suitable ventilating air ductwork and a ram source will be built into the aircraft and that purge gas lines connected to the spaces to be purged will be in place. The purged spaces will ordinarily be vented to the atmosphere to provide an ultimate outlet for the system.

Referring now to the drawings, in which a structure incorporating the present invention is shown diagrammatically, the device there shown is made up generally of heat and corrosion resistant sheet metal, such as stainless steel for instance. At one end of the device—to be referred to for convenience as the front end—an inlet adapter 10 is provided and is adapted for connection to ventilating air duct work leading to the previously mentioned ram intake, so that cold ventilating air at substantially the ambient temperature is introduced into this adapter. Ultimately this ventilating air after serving its function reaches the opposite end of the apparatus and exhausts from the end of the casing indicated at 12 into whatever ventilating air duct work is provided for carrying the heated ventilating air overboard.

The previously referred to tap into the compressor section of one of the jet engines, or any other appropriate source of compressed air, is connected to the fitting shown at 14. After passing through the apparatus within which this compressed air is mixed with fuel, is burned, is cooled and dewatered, the tempered products of combustion which serve as purge gases leave the apparatus at the fitting 16 and pass into appropriate duct work connected thereto which conveys the inert gas to the spaces in the aircraft to be purged and eventually overboard of the aircraft through suitable vents connected to these spaces.

Fuel under pressure—from the engine pumps for instance—is delivered to the conduit 18 and passes through a filter 20 and thence through an on-off valve 22 to a pressure regulator 24. On the outlet side of this regulator 24 the pressure of the fuel is relatively fixed so long as the aircraft is in operation, and it may be assumed, therefore, that the fuel arrives during operation of the apparatus at an air-fuel ratio regulator 26, which is connected to the pressure regulator 24, at a constant pressure. The outlet of the ratio regulator 26 is connected to a fuel line 28 leading to a nozzle (not shown) in the burner of the apparatus indicated generally at 30.

Combustion air entering the fitting at 14 passes through a flow regulator 32 and thence through a venturi 34 to the burner air induction pipe 36 which conveys combustion air to the burner 30. The purpose of the flow regulator 32 is to prevent wide fluctuations in compressor pressure from too greatly affecting the flow rate of purge gases.

The venturi 34 and a point upstream of the venturi are connected to a pair of pressure taps 40 and 42, respectively, which lead to the air-fuel ratio regulator 26 and serve to vary the fuel pressure so that it tracks with the combustion air flow rate in a well known manner.

Ignition in the burner 30 is provided by a conventional spark plug which is energized by a high tension lead indicated at 44. Any sudden excess pressure within the combustion air induction tube 36 is relieved by means of a spring loaded safety valve at 46.

Within the burner 30, fuel and combustion air are mixed and are burned to form hot products of combustion which pass out at the end of a burner tube 48 into a combustion chamber 50. From this chamber the gases flow outwardly through several passes formed in a concentric chamber heat exchanger indicated generally at 52, and eventually find their way to an exhaust gas outlet fitting 54. At this juncture the products of combustion have been lowered in temperature considerably by the exchange of a considerable portion of the heat therein to the ventilating air stream which finds its way, in a manner to be discussed presently, through a duct 56 connected by means of an adapter 58 to a cylindrical shell 60 which encloses the concentric chamber heat exchanger 52 and of course the burner and burner tube 48 therein. The opposite end of this cylindrical duct 60 forms the ventilating air outlet fitting previously referred to and indicated at 12.

The hot products of combustion from the fitting 54 are carried forwardly toward the left as seen in Fig. 1, by way of a duct 62 to a plenum chamber 64 formed around the inlet ends of the tubes 66 of a tube bundle heat exchanger 67. The tubes 66 extend transversely of the apparatus in parallel relation, these tubes all emptying into a common plenum chamber 68 toward the opposite side of the apparatus.

Forwardly or toward the left of the bundle of tubes 66 there are three additional tube bundle heat exchangers indicated generally at 70, 72 and 74. This arrangement is perhaps best shown in Fig. 3, where it will be seen that, unlike the tube bundle heat exchanger 67, the heat exchangers 70, 72 and 74 all have their tubes oriented longitudinally of the device. Furthermore, the inlet ends of all of the tubes of the heat exchangers 70, 72 and 74 are connected through a common header plate or tube sheet 76 which is enclosed by the ventilating air inlet adapter 10. Thus air entering the adapter 10 can flow through all of the tubes of the tube bundles 70, 72 and 74 in parallel with the air leaving the tubes at their opposite ends where they project through a second common tube sheet 78 located a short distance forwardly of the nearest tubes 66 of the heat exchanger 67.

The space between the tube sheet 78, and the most forwardly set of tubes 66 is indicated at 80. Within this space there is located a set of shutters made up of a plurality of slats or dampers 82 which are pivoted to rotate in unison about their horizontal axes (much like the slats of a Venetian blind) so as to open or close or partially throttle communication through the space 80 between the tubes in the heat exchangers 70, 72 and 74, and the inlet to the space around the heat exchange tubes 66. This shutter mechanism is most clearly seen in Fig. 2.

When these shutters 82 are in the open position, ventilating air entering the adapter 10 passes through the tubes of the heat exchangers 70, 72 and 74, through the chamber 80, and thence across the tubes 66 which are enclosed within a sheet metal shroud 84, and thence into an adapter 86 which connects in turn with the air duct 56 (previously mentioned) so that the ventilating air can continue on across the heat exchanger indicated at 52 and out of the apparatus at the fitting 12.

Beneath the portion of the apparatus taken up by the heat exchangers 70, 72 and 74, it will be noted, particularly in Figs. 2 and 3, that there is a thin, flat longitudinally extending air duct 88 which has its inlet end connected through a transverse slot 90 in the lower portion of the inlet adapter 10, while its opposite end opens through a slot 92 in the bottom of the air case 84 into the space surounding the heat exchange tubes 66. This opening 92 is in a position downstream of the shutters 82. The duct 88 thus forms a bypass in parallel with the tubes in the exchangers 70, 72 and 74. In an embodiment of the invention which may be considered as typical, the proportions are such that the flow rate through the bypass, as compared with that through the tubes of the heat exchangers 70, 72 and 74 when the shutters 82 are open, is approximately eighty percent through the tubes of the heat exchangers 70, 72 and 74 and twenty percent through the bypass. When the shutters 82 are in the closed position, the total cooling air rate through the system is approximately seventy percent of that which prevails with the dampers open, and of this total, most of the air flows through the bypass, although there will be some leakage around the dampers 82.

With the dampers 82 open, therefore, cooling air passes through the tubes of the heat exchangers 70, 72 and 74, across the tubes 66 and through the concentric chamber heat exchanger at 52. When the dampers 82 are closed, very little cooling air will pass through the heat exchanger tubes 70, 72 and 74, while the rate across the heat exchange tubes 66 and through the concentric chamber heat exchanger 52 will be about seventy percent of the full rate.

The purge gas plenum chamber 68 at one side of the apparatus and at the outlet end of the heat exchange tubes 66 is connected by a short duct 94 into the adjacent end of the space 96 surrounding the tubes of the heat exchanger pass 70. This space 96 is provided with a plurality of transverse baffles 98 which extend part way across the space in staggered relation from opposite sides, so as to cause the gases entering through the duct 94 to pass back and forth across the tubes carrying the cooling air several times before the purge gases reach the opposite end of the heat exchanger 70 adjacent the tube sheet 76. There they are conducted through a short duct or port 100 directly into the similar space 102 around the tubes of the heat exchanger 72. This space 102 is also provided with several transverse baffles 104 and has its opposite end, adjacent the tube sheet 80, connected through a short duct or port 106 to the space 96 near the opening of the inlet duct 94.

The last heat exchange pass, 74, also has a gas space 108 surrounding its tubes which is partly partitioned by staggered transverse baffles 110. This space 108 is connected by a port or short duct 112 adjacent the tube sheet 76 to the space 102 directly across from the port 100. At its opposite end, that is the end adjacent the tube sheet 78, the space 108 is connected to an outlet fitting and duct 114 leading to a carbon and water separator at 116.

Thus, the hot products of combustion after being cooled somewhat within the concentric chamber heat exchanger 52 are then passed through the heat exchange tubes 66 and thence across the heat exchange tubes of the heat exchangers 70 and 72 in parallel. That is, a portion of the gases pass across the tubes in the heat exchanger 70 while another portion flows through the nearby port or duct 106 into the space 102. The hot products of combustion, therefore, move toward the header plate 76 in parallel streams in a zigzag fashion around the baffles 98 and 104. These two streams rejoin adjacent the header plate 76 before passing together through the port 112 into the heat exchange space 108.

Thus the products of combustion are at their highest temperature within the concentric chamber heat exchanger 52 which inherently is best adapted to handle gases at such high temperatures The purge gases, while still quite hot, but after being tempered somewhat, pass through the heat exchange tubes 66 in cross-flow relationship to the cooling air, this cross-flow arrangement being quite suitable for exchanging heat from gases at a medium high temperature range where the problems of expansion and contraction due to considerable temperature change are quite severe.

It is apparent also that the hot products of combustion after having passed through the two heat exchangers at 52 and 67 pass through the heat exchangers at 70 and 72 in counterflow relation to the cooling air and finally through the last pass at 74 in parallel flow. As a whole, the system is generally of a highly efficient counterflow type, since the cooling air passes progressively from the cooler to the hotter surfaces. The arrangement, furthermore, makes it possible to separate the burner and its control equipment and the concentric chamber heat exchanger (these elements being most readily and reliably constructed and handled as a unit) from the cooler heat exchange portions of the system. Also, the cooler portion of the heat exchange mechanism, which consists of the heat exchange tubes 66, the shutters 82, and the tube bundle heat exchangers at 70, 72 and 74, is extremely compactly arranged in a single unit which can be spaced from the burner and its control system and the concentric chamber heat exchanger 52 as may be dictated by the aircraft structure, or as is otherwise desirable by the simple expedient of changing the lengths of the two cylindrical tubes which form the air conduit 56 and the gas conduit 62.

In addition to the above it will be seen that as the shutters indicated at 82 are closed to reduce the cooling capacity of the system under conditions where freezing might otherwise result, adequate although less cooling air is still received by the tube bundle at 66 and by the concentric chamber heat exchanger at 52, although almost no cooling is provided in the portion of the system that normally operates at the coolest temperature, namely the heat exchange passes at 70, 72 and 74.

A thermostatic controller is indicated at 118 and this unit may be of any suitable type, several being available for the purpose, and includes a temperature sensitive element 120 which projects into the cooling air space at 80 so as to sense the temperature therein and a mechanism for rotating a shaft 122. This shaft is connected to the dampers at 82 and is so arranged that as the temperature of the sensing element 120 drops, the damper elements 82 will be rotated toward closed position. Inasmuch as a drop in the temperature of the ventilating air in the space 80, indicating excessive cooling, tends to cause the actuator 118 to move the dampers 82 toward closed position, this will in turn raise the temperature of the small quantity of ventilating air which leaks through the space 80 around the dampers 82. This is because less ventilating air will be flowing through the heat exchange tubes in the tube bundles 70, 72 and 74 under these conditions. This in turn causes the actuator to tend to open the dampers 82 slightly. The ultimate result is that the system automatically causes the dampers 82 to seek a position such that excessive cooling of the products of combustion is avoided, since the dampers tend to hunt about a position where the cooling air, after having passed through the heat exchange section at the coolest portion of the heat exchanger, is held reasonably constant. Furthermore, this simple system has the advantage that the thermostatic sensing element, the actuator controlled thereby and the dampers are all physically related close together.

After the products of combustion have passed the carbon and water separator at 116, where the major portion of the water with the carbon entrained therein is separated and passed through a drain tube 124 into the ventilating air adapter 86, these products of combustion pass through a duct 126 leading to the outlet at 16. Flow through this duct is regulated by a valve 128 and upstream of this valve there is a branch conduit 130 which connects the duct 126 with the ventilating air duct 56. This branch also contains a valve 132 which is interconnected so as to be operated in conjunction with the valve 128 in such fashion that whenever one of these valves is open the other is closed. This valve arrangement is for the following purpose.

When the system is first placed into operation and before combustion has stabilized, and while air is still being swept from the gas side of the system, the purge gases will be of low quality for purging purposes. Under these conditions the valve 128 is closed and the valve 132 is opened so that the products of combustion can pass into the ventilating air duct 56 and thence overboard of the aircraft. After stable operation has been achieved, valve 132 is closed and valve 128 is opened, thus passing the purge gases, after they have become of suitable quality, to the spaces to be purged.

A suitable arrangement for operating the valves 128 and 132 is to provide a thermostatic element as at 134 within the gas duct fitting 54, since the temperature of the gases at this point is an indication of stable operation of the system. Thus, when the system is placed into operation, the thermostatic element 134 will be at a low temperature. By the time the temperature of this element has risen to a level near that at which the system stabilizes when in operation, all of the air will have been swept from the gas passages and stable combustion will have been achieved, thereby making it appropriate for the thermostatic element 134 to open the valve 128 and close the valve 132 when the temperature of the element 134 has risen to a point somewhat below that at which the system stabilizes when in operation.

A second thermostatic element, as at 136, can be placed in the ventilating air stream near the outlet 12 and may be used for turning off the system in the event that some malfunction causes the system to overheat.

Note that the separated water passes into the hot ventilating air by way of the short tube 124 and thus is insured of being passed overboard at a temperature where freezing is not possible.

The control system for the burner and the details of the arrangement for operating the valves 128 and 130 from the thermostat 134 need no further discussion here, since these matters are well covered in the copending application previously referred to, and in any event do not in themselves form a portion of the subject matter of the present invention. This is also true of the construction of the burner and concentric chamber heat exchanger 52.

From the above it will be seen that the arrangement disclosed and which forms the subject matter of this application well suits the purpose in that it is compact and light in weight but nevertheless provides dewatered and cooled products of combustion at a safe temperature and without danger of freezing, with a minimum of complexity and with a high order of heat exchange and control efficiency.

From the above description of a preferred embodiment of my invention which I have illustrated diagrammatically only, since this is sufficient to teach the invention, it will be seen that many variations in the structure can be made without departing from either the scope or spirit of the invention and that, therefore, the scope of the present invention is to be measured by the scope of the following claims.

Having described my invention, what I claim is new and useful and desire to secure by Letters Patent of the United States is:

1. In a purge gas generating system, means providing a casing having an air inlet end and an air outlet end, means for burning a fuel-air mixture to form hot products of combustion, first heat exchange means connected to receive products of combustion from said burner means for exchanging a portion of the heat from said products of combustion to an air stream, said burner means and said first heat exchange means being disposed as a unit in said casing adjacent the outlet end thereof, means forming a first tube bundle heat exchanger with the tubes thereof extending transversely of said casing at a position adjacent to said first heat exchange means but closer to said casing inlet than said first heat exchange means, conduit means connected for conducting products of combustion from the first said heat exchange means to flow through the tubes in said tube bundle, means forming second, third and fourth tube bundle heat exchangers in side by side relationship in said casing at a position between said casing inlet and the tubes of said first tube bundle heat exchanger, means forming separate closed spaces around the tubes in said second, third and fourth tube bundles, all of the tubes in said second, third and fourth tube bundles being parallel and extending longitudinally of said casing so that air flowing through said casing from said inlet to said outlet passes firstly through the tubes in said second, third and fourth tube bundles, secondly across the tubes in said first tube bundle, and thirdly through said first heat exchanger, interconnecting conduit means between the tubes of said first tube bundle and the adjacent ends of the closed spaces around the tubes in said second and third tube bundles, means connecting the opposite ends of the last said closed spaces to the most adjacent end of the closed space around the tubes in the fourth said tube bundle, a gas outlet fitting, means connecting the opposite end of the last said closed space to said outlet fitting, means forming an air bypass connected between the casing adjacent the tubes in the first said tube bundle and said casing inlet, damper means disposed in said casing between said second, third and fourth tube bundles and the bypass connection to said casing, means sensitive to the air temperature within said casing at a point between said second, third and fourth tube bundles and said damper means, and means connected to said damper means for closing the latter as said temperature sensitive means cools toward a predetermined level and for opening said damper means as the temperature of said temperature sensitive means rises above said level.

2. In a purge gas generating system, means providing a casing having an air inlet end and an air outlet end, means for burning a fuel-air mixture to form hot products of combustion, first heat exchange means connected to receive products of combustion from said burner means for exchanging a portion of the heat from said products of combustion to an air stream, said burner means and said first heat exchange means being disposed as a unit in said casing adjacent the outlet end thereof, means forming a cross flow tube bundle heat exchanger with the tubes thereof extending transversely of said casing at a position adjacent to said first heat exchange means but closer to said casing inlet than said first heat exchange means, conduit means connected for conducting products of combustion from the first said heat exchange means to flow through the tubes in said cross flow heat exchanger, means forming a counterflow tube bundle heat exchanger and a parallel flow tube bundle heat exchanger in side by side relationship in said casing at a position between said casing inlet and the tubes of said cross flow heat exchanger, means forming separate closed spaces around the tubes in said counterflow and parallel flow heat exchangers, all of the tubes in said counterflow and parallel flow tube bundles extending longitudinally of said casing so that air flowing through said casing from said inlet to said outlet passes firstly through the tubes in said counter flow and parallel flow heat exchangers, secondly across the tubes in said cross flow heat exchanger, and thirdly through said first heat exchanger, interconnecting means connected between the tubes in said cross flow heat exchanger and the adjacent end of the closed space around the tubes in said counterflow heat exchanger, means connecting the opposite end of the last said closed space to the most adjacent end of the closed space around the tubes in said parallel flow heat exchanger, a gas outlet fitting, means connecting the opposite end of the last said closed space to said outlet fitting, means forming an air bypass connected between the casing adjacent the tubes in the cross flow heat exchanger and said casing inlet, damper means disposed in said casing between said counterflow and parallel flow heat exchangers and the bypass connection to said casing, means sensitive to the temperature within said casing at a point between said counterflow and parallel flow heat exchangers and said damper means, and means connected to said damper means for closing the latter as said temperature sensitive means cools to a predetermined level and for opening said damper means as the temperature of said temperature sensitive means rises above said level.

3. In a purge gas generating system, means providing a casing having an air inlet end and an air outlet end, means for burning a fuel-air mixture to form hot products of combustion, first heat exchange means connected to receive products of combustion from said burner means for exchanging a portion of the heat from said products of combustion to an air stream, said burner means and said first heat exchange means being disposed in said casing adjacent the outlet end thereof, means forming a cross flow tube bundle heat exchanger with the tubes thereof extending transversely of said casing at a position adjacent to said first heat exchange means but closer to said casing inlet than said first heat exchange means, conduit means connected for conducting products of combustion from the first said heat exchange means to one end of the tubes in said tube bundle to flow through the tubes in said cross flow heat exchanger, means forming additional heat exchange means having air and gas passages in said casing at a position between said casing inlet and the tubes of said cross flow heat exchanger so that air flowing through said casing from said inlet to said outlet passes firstly through said air passages, secondly across the tubes in said cross flow heat exchanger, and thirdly through said first heat exchanger, interconnecting means between the other end of the tubes in said cross flow heat exchanger and one end of said gas passage, a gas outlet fitting, means connecting the opposite end of said gas passage to said outlet fitting, means forming an air bypass connected to said casing adjacent the tubes in the cross flow heat exchanger at one end and said casing inlet at the other end, damper means disposed in said casing between said additional heat exchange means and the bypass connection to said casing adjacent the tubes in said cross flow heat exchanger, means sensitive to the temperature within said casing at a point between said additional heat exchange means and said damper means, and means connected to said damper means for closing the latter as said temperature sensitive means cools to a predetermined level and for opening said damper means as the temperature of said temperature sensitive means rises above said level.

4. In a purge gas generating system, means providing a casing having an air inlet end and an air outlet end, means for burning a fuel-air mixture to form hot products of combustion, first heat exchange means connected to receive products of combustion from said burner means for exchanging a portion of the heat from said products of combustion to an air stream, said burner means and said first heat exchange means being disposed in said casing adjacent the outlet end thereof, means forming a cross flow tube bundle heat exchanger with the tubes thereof extending transversely of said casing at a position spaced from said first heat exchange means toward said casing inlet, conduit means connected for conducting products of combustion from the first said heat exchange means to flow through the tubes in said cross flow heat exchanger, means forming additional heat exchange means having air and gas passages disposed in said casing at a position spaced from the tubes of said cross flow heat exchanger toward said casing inlet so that air flowing through said casing from said inlet to said outlet passes firstly through said air passages, secondly across the tubes in said cross flow heat exchanger, and thirdly through said first heat exchanger, interconnecting means between the tubes in said cross flow heat exchanger and one end of said gas passage, a gas outlet fitting, means connecting the opposite end of said gas passage to said outlet fitting, means forming an air bypass connected at one end to the casing adjacent the tubes in said cross flow heat exchanger and at the other end to said casing inlet, damper means disposed in said casing between said additional heat exchange means and the bypass connection to the casing adjacent the tubes in said cross flow heat exchanger, and means connected to said damper means for closing the latter as the temperature at a selected place in the system drops to a level indicating danger of freezing.

5. In a purge gas generating system, means providing a casing having an air inlet end and an air outlet end, means for burning a fuel-air mixture to form hot products of combustion, first heat exchange means connected to receive products of combustion from said burner means for exchanging a portion of the heat from said products of combustion to an air stream, said burner means and said first heat exchange means being disposed in said casing toward the outlet end thereof, means forming a cross flow tube bundle heat exchanger with the tubes thereof extending transversely of said casing at a position spaced from said first heat exchange means toward said casing inlet, conduit means connected for conducting products of combustion from the first said heat exchange means to flow through the tubes in said cross flow heat exchanger, means forming additional heat exchange means having air and gas passages disposed in said casing at a position spaced from the tubes of said cross flow heat exchanger toward said casing inlet so that air flowing through said casing from said inlet to said outlet passes firstly through said air passages, secondly across the tubes in said cross flow heat exchanger, and thirdly through said first heat exchanger, interconnecting means between the tubes in said cross flow heat exchanger and one end of said gas passage, a gas outlet fitting, means connecting the opposite end of said gas passage to said outlet fitting, means forming an air bypass connected at one end to said casing adjacent the tubes in said cross flow heat exchanger and at the other end to said casing inlet and adjustable means for proportioning the relative rate of air flow as between said air passages and said bypass.

References Cited in the file of this patent

UNITED STATES PATENTS

| | | |
|---|---|---|
| 2,444,951 | Paget | July 13, 1948 |
| 2,618,470 | Brown et al. | Nov. 18, 1952 |